Patented Nov. 28, 1950

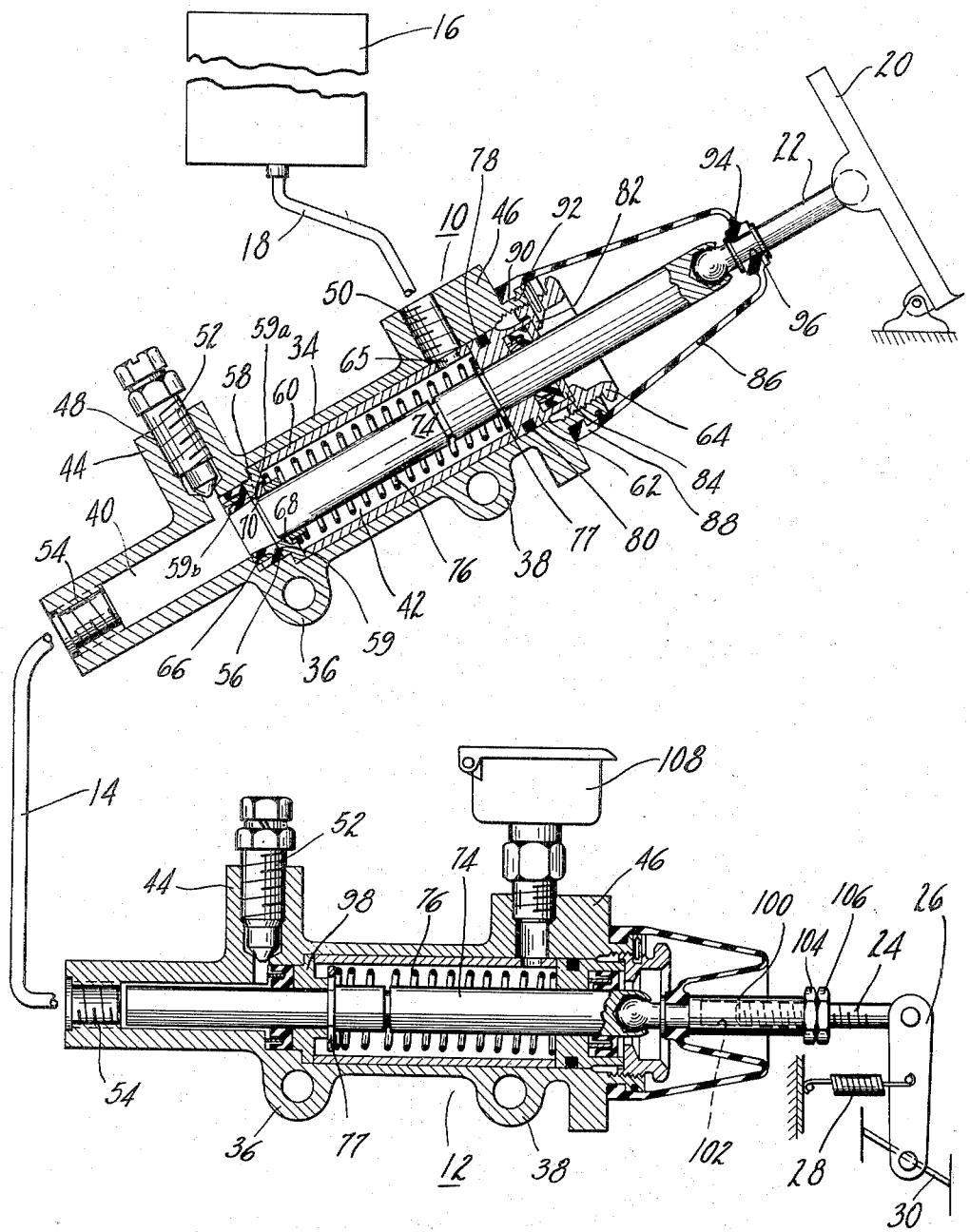

2,531,705

UNITED STATES PATENT OFFICE 2,531,705

MASTER AND RECEIVER CYLINDER CONSTRUCTION

Harold B. Schultz, South Bend, Ind., assignor to Bendix Aviation Corporation, South Bend, Ind., a corporation of Delaware Application March 12, 1947, Serial No. 734,269

2 Claims. (Cl. 60—54.5)

This invention relates to hydraulic systems of the class involving master and receiver cylinders.

It is an important object of the invention to provide master and receiver cylinders for a hydraulic system in which the cylinders have a maximum number of interchangeable parts.

A more important object of the invention resides in the provision of a master cylinder simple in construction and economical to manufacture.

The above and other objects and features of the invention will be apparent from the following description of the apparatus taken in connection with the accompanying drawing which forms a part of this specification.

Referring now to the single figure of the drawing in which the invention is illustrated in association with a throttle control, reference number 10 designates a master cylinder for operating a receiver cylinder 12 through a conduit 14 which transmits fluid under pressure between the two cylinders. The master cylinder is connected to a reservoir 16 through a conduit 18. A foot pedal 20 is operatively connected to the master cylinder through thrust rod 22. A linkage arrangement comprising an adjustable rod 24, a lever 26 pivotally connected thereto and a spring 28, connects the receiver cylinder with a butterfly valve 30, of a carburetor, not shown, to transmit an actuating force to the valve when the pedal 20 is depressed.

The master cylinder includes a housing 34 provided with mounting lugs 36 and 38 and step bored at 40 and 42. Bosses 44 and 46 are axially spaced apart exteriorly of the housing and are drilled and threaded at 48 and 50 to provide openings which communicate with bores 40 and 42 respectively. A normally closed valve 52 is located in opening 48 to permit bleeding or purging the system of air. Opening 50 is connected to the reservoir 16 via conduit 18. One end of the stepped bore is threaded at 54 to threadedly engage the conduit 14 which interconnects the two cylinders.

A packing ring 56 U-shaped in cross section, is disposed within the stepped bore at the junction of the bores 40 and 42 and held from axial movement by a bushing 58, sleeve 60, bushing 62 and a nut 64 which threadedly engages the right end of the stepped bore to hold the parts in assembled relationship. The sleeve 60 is cut out at 65 to communicate the bore with the reservoir through opening 50. A spacer ring 66 is positioned in the open end of the U-shaped packing ring 56 to prevent deformation of the packing ring between the bushing 58 and the shoulder formed at the junction of bores 40 and 42. The packing ring is constructed with a base portion 59, a heel 59a, and a toe 59b. Bushing 58 is recessed at 68 and includes a plurality of circumferentially spaced axially drilled passages 70 which communicate opening 50 with opening 54. The toe 59b is annular in form and resilient in character to circumferentially wipe against a piston 74 of substantially uniform diameter throughout its length and slidable in the bores 40, 42.

The piston 74 is normally spring biased to a retracted position in the bore by a spring 76 encircling the piston and having one end resting against the bushing 58 and its other end in engagement with a split washer 77 carried by a shallow groove in the piston. The bushing 62 is equipped with an exterior groove 78 to receive a seal 80 to prevent leakage of oil from the system to atmosphere between the bore 42 and bushing 62. A second packing ring identical with packing ring 56 is located in one end of bushing 62 and securely held therein by the nut 64 which has an inner annular obstructing flange 82 arranged in contact relationship with washer 84 which in turn is contiguous with the closed end of the packing ring. The latter mentioned packing ring encircles the piston and prevents leakage of oil from the system between the bushing and piston to the atmosphere.

One end of the piston extends exteriorly of the housing and is formed to swivelly receive one end of the thrust rod 22. A flexible boot or housing 86 fits over one end of the piston and has an enlarged open end 88 provided with a bead 90 configured to fit into a groove 92 in the housing 34 and a substantially closed end 94 formed with a thickened section having an opening 96 therein encircling the thrust rod 22. This boot is intended to exclude dirt from the system.

It should be noted that the parts of the master and receiver cylinders are identical. Therefore, a description of the receiver cylinder is believed unnecessary. In the drawing, bushing 98 of the receiver cylinder is slightly different from bushing 58 of the master cylinder but it should be understood that the latter bushing is interchangeable with both cylinders. In fact, all the parts of the master and receiver cylinders are interchangeable. A thrust rod 100 is swivelly coupled to piston 74 of the receiver cylinder. The thrust rod is interiorly bored at 102 to receive one end of the adjustable rod 24. The end of rod 24 which extends into the bore 102 is slidable therein with no positive connection thereto. With the piston of the receiver cylinder in its retracted position, as shown, the throttle opening is regulated by positioning of the nuts 104, 106. An oil cup 108 is mounted on the receiver cylinder to wet one side of the packing rings.

With the master cylinder piston in retracted position as shown in the drawing, fluid can pass from the reservoir 16, through opening 50, around the end of the piston and past packing ring 56 to line 14, and thence to the left end of the receiver cylinder, to thereby replenish the system with oil after each throttle release. That is, packing ring 56 is positioned within the stepped bore so that it lies adjacent the end of the piston but out of contact therewith when the piston is retracted to provide for the free passage of fluid between one end of the receiver cylinder and the reservoir 16. Attention is called to the fact that the receiver cylinder piston is so disposed in its housing that this same packing ring, corresponding to the last mentioned packing ring of the master cylinder, is at all times in sealing relationship to the piston. Stating it another way, when the receiver cylinder piston is in its retracted position, the end of the piston is forward of the packing ring 56 and in circumferential contact therewith. In the receiver cylinder the split washer 77 is located in the narrow left-hand groove of the piston with the spring acting thereagainst urging the piston to the left or in a retracted position.

Operation of the system is as follows:

In the drawing, the throttle is shown in closed position. To open the butterfly valve 30, pedal 20 is depressed which moves the master cylinder piston to the left against spring 76 to put fluid in the system and in the left end of the receiver cylinder under pressure to thereby act on the left end of the receiver cylinder piston to move it against spring 76 of the receiver cylinder to actuate the valve through the linkage arrangement. Springs 76 tend to return their respective pistons to retracted position upon release of pedal 20. Since rod 24 is not positively connected to the thrust rod 100 so as to be moved by the same when retracted, the latter rod can return without moving the butterfly valve in a closing direction. However, spring 28 of the linkage structure normally urges rod 24 in a direction to follow the movement of the piston toward its retracted position to thereby cause the butterfly valve to be moved in a direction tending to close the same.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

I claim:

1. A master cylinder adapted for use with a hydraulic system having a receiver cylinder therein all the parts of which are interchangeable with the master cylinder parts but not necessarily having the same relative positions with respect to the corresponding master cylinder parts and comprising a housing with a bore therein, an opening in one end of the bore, an opening in the housing in communication with the other end of the bore, a piston in the bore, said piston having a substantially uniform diameter and provided with means for normally positioning said piston in correspondingly opposite ends of the master and receiver cylinders, a packing ring of U-shaped cross-section located in the bore intermediate the openings for receiving the piston, the packing ring being positioned so that the open end of the U-shaped section faces said opening in said one end of the bore and the closed end of the U-shaped section is toward said other end of the bore, said piston being slidable in the bore and normally retracted to said other end of the bore so that one end of the piston is contiguous the closed end of the U-shaped section to establish communication between the openings, a bushing in the bore encircling the piston and in contact relationship with the closed end of the U-shaped section and constituted to pass fluid, a sleeve in the bore having an opening in registry with the opening in said housing and having an end in engagement with the bushing, means including a bushing in the other end of the bore for holding said first named bushing and said sleeve in assembled relationship, and a second packing ring of U-shaped cross-section encircling said piston and carried by said second named bushing and arranged therein so that the open end of the U-shaped section is in the same direction as the open end of said first named U-shaped section.

2. A master cylinder for use with a hydraulic system having a receiver cylinder therein all the parts of which are interchangeable with the master cylinder parts but not necessarily having the same relative positions with respect to the corresponding master cylinder parts and comprising a housing with a stepped bore therein, an opening in one end of the bore, an opening in the housing in communication with the other end of the bore, a piston in the bore, said piston having a substantially uniform diameter and provided with means for normally positioning said piston in correspondingly opposite ends of the master and receiver cylinders, a packing ring secured in the bore intermediate the openings and at the junction of the stepped bore and having an annular portion projecting into the bore to contact the outer surface of the piston, said piston being slidable in the bore and normally retracted toward said other end of the bore so that one end of the piston is contiguous the packing ring but out of contact therewith to establish communication between the openings, a bushing in the bore encircling said one end of the piston and in abutting relationship to the packing ring and constituted to pass fluid therethrough, a sleeve in the bore encircling said piston and having an end resting against said bushing, said sleeve being provided with an opening in its side to register with the opening in the housing, a second bushing in the other end of the bore in engagement with the other end of the sleeve, a second packing ring carried by the second bushing and having an annular portion projecting into the bore in contact relationship with the outer surface of the piston, a nut threadedly positioned in said other end of the bore adjacent said second bushing and encircling said piston to be drawn against said second bushing to hold said first mentioned packing fixed in the bore, and a coiled spring in the sleeve encircling said piston and constructed and arranged to bias said piston to retracted position.

HAROLD B. SCHULTZ.

REFERENCES CITED

The following references are of record in the file of this patent:

UNITED STATES PATENTS

| Number | Name | Date |
| --- | --- | --- |
| 1,865,561 | Furgason | July 5, 1932 |
| 2,057,707 | Carroll | Oct. 20, 1936 |
| 2,182,237 | Rasmussen | Dec. 5, 1939 |
| 2,190,257 | Clench | Feb. 13, 1940 |
| 2,195,244 | Ericson | Mar. 26, 1940 |
| 2,243,385 | Levy | May 27, 1941 |
| 2,286,452 | Worth | June 16, 1942 |